United States Patent
Noessing et al.

(10) Patent No.: US 8,339,145 B2
(45) Date of Patent: Dec. 25, 2012

(54) LINE TESTING

(75) Inventors: Gerhard Noessing, Villach (AT); Alberto Canella, Villach (AT); David Schwingshackl, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 394 days.

(21) Appl. No.: 12/563,652

(22) Filed: Sep. 21, 2009

(65) Prior Publication Data

US 2011/0025343 A1    Feb. 3, 2011

Related U.S. Application Data

(60) Provisional application No. 61/229,734, filed on Jul. 30, 2009.

(51) Int. Cl.
*G01R 31/02* (2006.01)
*G01R 31/08* (2006.01)

(52) U.S. Cl. .............. 324/539; 324/543; 324/527

(58) Field of Classification Search .......... 324/543, 324/539, 527
See application file for complete search history.

(56) References Cited

U.S. PATENT DOCUMENTS

| | | | | |
|---|---|---|---|---|
| 6,278,769 | B1 * | 8/2001 | Bella | 379/29.11 |
| 7,365,547 | B2 * | 4/2008 | Ferianz | 324/538 |
| 2005/0258841 | A1 * | 11/2005 | Blechschmidt et al. | 324/713 |
| 2008/0101550 | A1 * | 5/2008 | Noessing et al. | 379/30 |

FOREIGN PATENT DOCUMENTS

| | | |
|---|---|---|
| EP | 0961467 A1 | 12/1999 |
| WO | 2007/045410 A1 | 4/2007 |

OTHER PUBLICATIONS

International Search Report, Feb. 10, 2011, PCT Appl. No. PCT/EP2010/004644.

* cited by examiner

*Primary Examiner* — Amy He
(74) *Attorney, Agent, or Firm* — SprylP, LLC

(57) ABSTRACT

A signal generator is disclosed that generates a test signal to be applied to a first and second wire of a subscriber line. The signal generator is configured to generate the test signal at the first and second test signal outputs in a first time section such that a first potential at the first test signal output is changed from a first value to a second value and a second potential at the second test signal output is maintained constant at least during the change of the first potential. The signal generator is further configured to generate the test signal during a second time section such that the first potential at the first output and the second potential at the second output are oscillating with a predetermined frequency.

21 Claims, 15 Drawing Sheets

200

Generating a test signal to be applied between a first and second wire of a transmission line such that in a first time section a first potential at a first test signal output is changed from a first value to a second value and a second potential at the second test signal output is maintained at a constant value at least during the change of the first potential    202

Measuring at least one parameter of a line signal resulting from applying the test signal to the subscriber line

204

Determining at least one line test parameter based on the at least one parameter of the line signal

LINE TESTING

REFERENCE TO RELATED APPLICATION

This application claims the benefit of the priority date of U.S. provisional application 60/229,734 filed on Jul. 30, 2007, the content of which is herein incorporated by reference.

BACKGROUND

Line testing is typically employed in communication networks where terminal devices located in the premises of a customer and therefore also referred to as Customer Premise Equipment (CPE) is connected by means of a wired communication line with a central termination of the subscriber line which is typically a Central Office (CO). An example is the Public Switched Telephone Network (PSTN) where the terminal devices like telephones and faxes are connected to the Central Office by means of copper twisted pairs, which are typically called the "Tip" and "Ring" wires. The "Tip" and "Ring" wires are sometimes called also the A-B wires.

Other data communication services may be provided over the copper wires such as Integrated Digital Networks (ISDN), Digital Subscriber Lines (DSL) such as ADSL (Asymmetric DSL), VDSL (Very High DSL) etc., or All Digital Loops (ADL). Central Offices of communication networks are usually equipped with a device for performing a metallic line testing. The metallic line testing may be a sequence of electrical measurements which are repeated for each subscriber line with a particular frequency for example every 12 hours. The goals of the line testing is to determine information on the condition of the line such as to detect if the line is broken or affected by leakage or corrosions, to detect if a Foreign Electromotive (FEM) Voltage or any external disturbance is coupled with one or both of the Tip-Ring wires of a copper pair, to measure a loop length, to measure the typical cable parameters like the capacity between the two wires "Tip" and "Ring" of the communication line or the capacity between the Tip wire and Ground and between the Ring wire and Ground. Other goals include the detection of a DSL signature or passive probe termination circuits on the CPE side, to measure the ringer load which basically includes to detect how many telephones are connected in parallel to the same subscriber loop, to monitor the loop current in different states of the loop such as when the telephone is in Off-Hook, On Hook etc., or to perform tests in parallel with an ongoing DSL transmission without impacting its performances in terms of data rate and transmission errors.

In some situations of a failure, the Subscriber may call the Hotline of the Service Provider or the local Telecom and complain about the communication problems. The operator may then run on-the-fly a Line Testing on that particular subscriber line loop by means of dedicated software which is typically referred to as the "Expert System". The results of the measurements will be displayed after some time at the Operators computer so that he can determine the situation and condition of the line including where the problem takes place, if it is necessary to provide a technician for the on-site maintenance or repair etc.

SUMMARY

In one aspect, a method includes generating a test signal to be applied between a first and second wire of a transmission line, wherein the test signal is generated between a first and second test signal output such that in a first time section a first potential at the first test signal output is changed from a first value to a second value and a second potential at the second test signal output is maintained at a constant value at least during the change of the first potential. At least one parameter of a line signal resulting from applying the test signal to the transmission line is measured. At least one line test parameter is determined based on the at least one parameter of the line signal.

In a further aspect, a line testing method includes a generating of a subscriber line test signal in a first measurement part such that a first potential at a first test signal output and a second potential at a second test signal output are different from the first potential and measuring at least one line test parameter of a first line signal resulting from applying the test signal in the first measurement part. The line testing is further generated such that in a second measurement part the test signal is generated with a same potential at the first and second test outputs. At least one parameter of a second line signal resulting from applying the test signal in the second measurement part is measured.

BRIEF DESCRIPTION OF THE SEVERAL VIEWS OF THE DRAWINGS

FIG. 2 shows a flow chart diagram according to an embodiment.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

It is to be understood that the features provided in the various exemplary embodiments and claims described herein may be combined with each other, unless specifically noted otherwise.

In the various figures, identical or similar entities, modules, devices etc. may have assigned the same reference number.

The embodiments described below are directed to a new concept of line testing signals applied to the outputs of a line test signal generating device and used for determining one or more subscriber line parameters. As will further be described in more detail, the new concept allows to provide a line testing independent of a particular implementation of the communication system and the line testing for the communication system. For example, a line testing implementation may include a direct application of the line test signal without any high ohmic resistance to the subscriber line which is commonly used in subscriber line testing. However, in case of a line test system which supplies the line test signals via a high ohmic resistor, a different situation occurs. While conventional line test signals fail to provide test signals which allow an accurate determination of line parameters in a normal and failure situation for all of the above described different implementations of a line test system, the new concept of a line testing described in the following embodiments allows to address an accurate line testing independent of a particular implementation of the system.

Figure 1A:
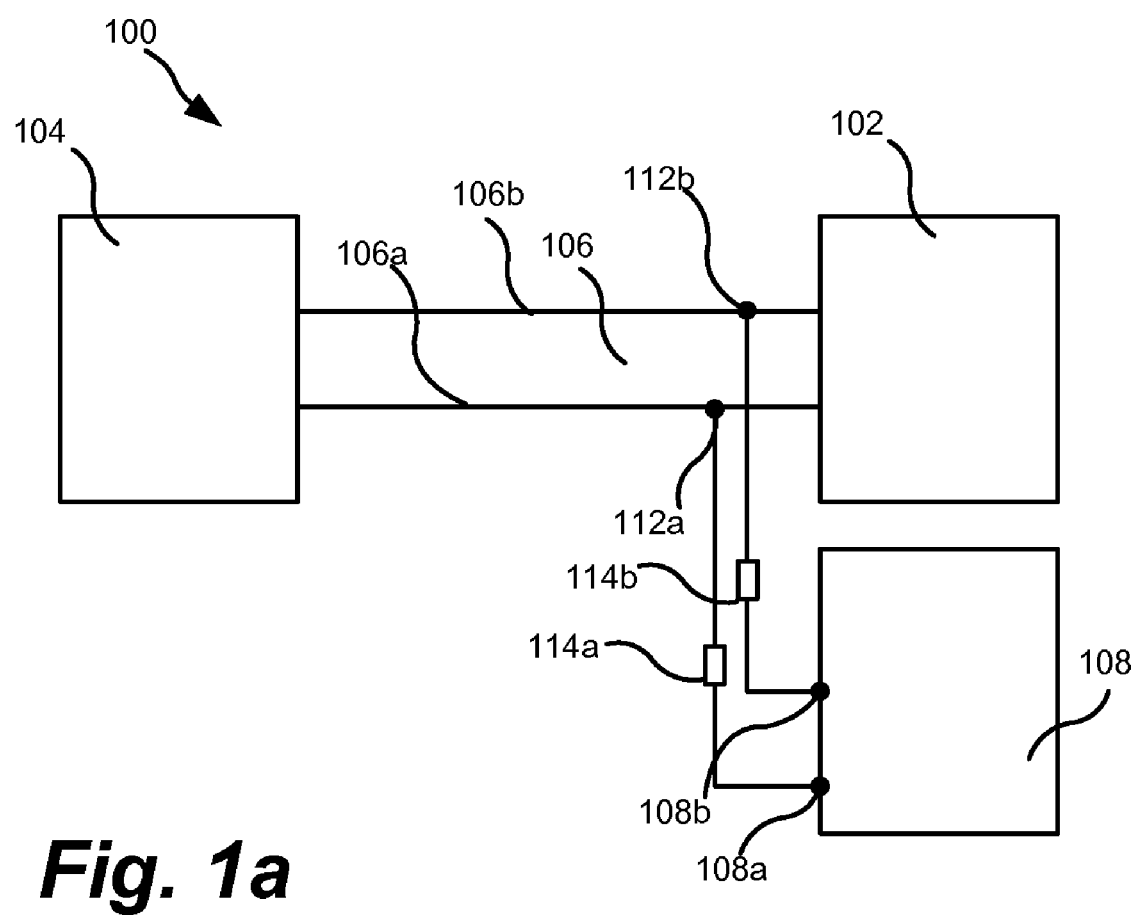
FIGS. 1a and 1b show a block diagram according to an embodiment.

In order to illustrate the above, FIG. 1a shows one embodiment of a line test system which uses a ohmic resistor to apply the test signal from the outputs of a test signal generating device to the subscriber line. The ohmic resistor may have a relatively high value for example in the range between 5 and 50 kOhm. In some embodiments, the resistors may be part of a resistor matrix. Each resistor may be formed of two or more resistor units.

FIG. 1a shows a communication system 100 which may for example be a DSL system having a first termination 102 which may for example be a Central Office termination and a second termination 104 which may for example be a Costumer Premise Equipment termination 104. The terminations 102 and 104 are connected by a wired subscriber line 106 having a first wire 106a and a second wire 106b. The first and second wires 106a and 106b may for example be the Tip and Ring wires of a twisted copper pair.

In the embodiment of FIG. 1a, a test signal generator or test unit 108 has a first test signal output 108a and a second test signal output 108b. The test signal outputs 108a and 108b are connected via resistors 114a and 114b at nodes 112a and 112b to the subscriber line 106.

In order to execute the line testing, the test unit 108 generates a sequence of test signals which may include DC voltages, AC voltages, voltage ramps etc. The test signals are applied to the line 106 and a measurement is performed of how the line reacts to the line test signals. In other words, parameters of a line signal resulting from the applying of the test signal such as the currents generated on the line by the test signals are measured.

Typically but not necessarily, the line testing may also fulfill other requirements such as a limited duration, for example 20 seconds per line, a high accuracy and low costs. Furthermore, a line testing may in some cases be required to address or react to an Off-Hook event which occurs when the subscriber wants to start a telephone call during an ongoing test. In addition, the line testing may in some cases be required to have no impact on a simultaneous DSL data transmission. This may be provided by avoiding impedance changes or voltage steps which might generate transmission errors on the data link or in an even worse case would require a new training of the transceivers. Furthermore, in PSTN systems there may be also the problem that while the test is being executed old mechanical phones could generate an audible short ringing which is also referred to as tinkling.

Typically, the parameters to be determined in the line testing include the resistance Rtr between Ring and Tip, the resistance Rrg between the Ring and ground, the resistance Rtg between Tip and ground, the capacitance Ctr between Tip and Ring, the capacitance Crg between the Ring and ground and the capacitance Ctg between Tip and ground.

Figure 1B:
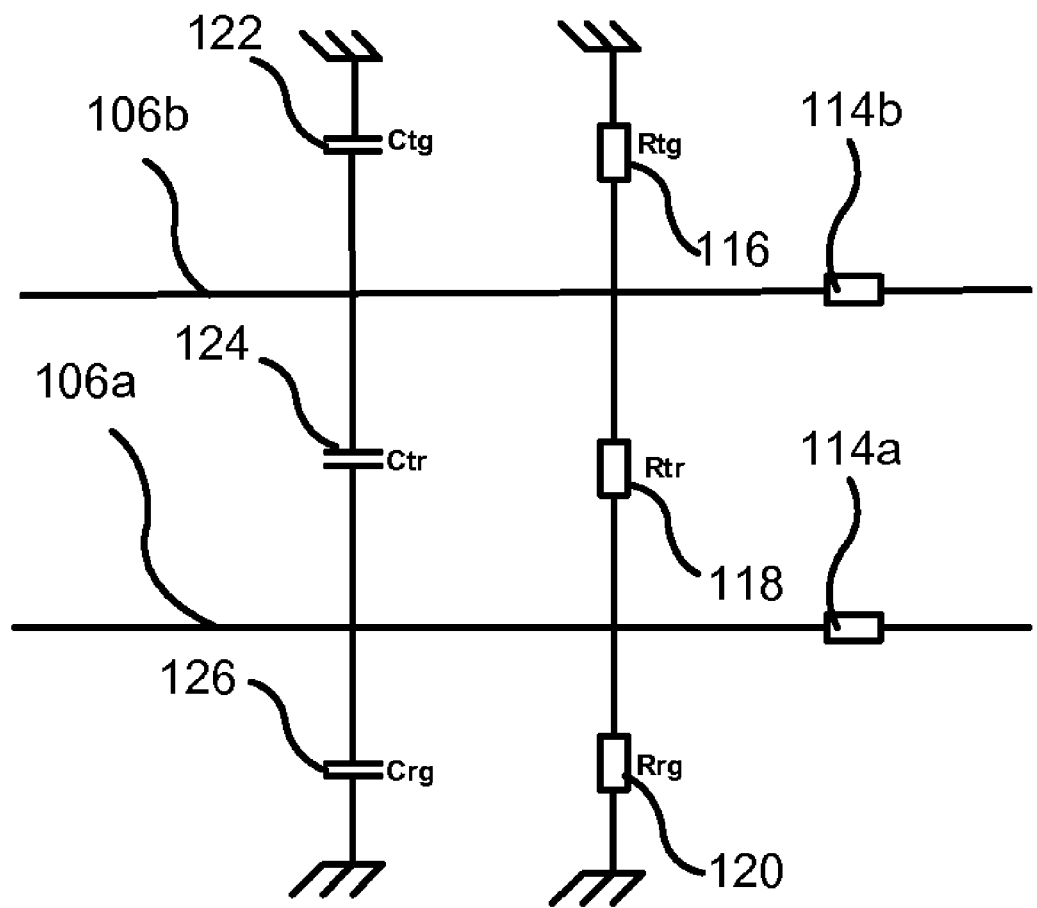

FIG. 1b shows a model of the communication system 100 including the resistance Rtg indicated by reference number 116, the resistance Rtr indicated by reference number 118, the resistance Rrg indicated by reference number 120, the capacitance Ctg indicated by reference number 122, the capacitance Ctr indicated by reference number 124, the capacitance Crg indicated by reference number 126.

The above six parameter allow to determine whether the line is affected by shortcuts, i.e. small resistances. Furthermore, these six parameters allow determining the loop length because the capacitance Ctr, Crg and Ctg are proportional to the length of the cable and how the loop is terminated.

In the following embodiments of line testing sequences will be described which allow addressing the measurement of some or all of these above mentioned six parameters. The embodiments described provide an accurate line testing independent of the specific implementation of the line testing equipment and independent of the specific implementation of the communication system. In some embodiments the line testing can for example be implemented in a dedicated line testing equipment and in other embodiments the line testing can also be implemented in a line testing equipment which is integrated in an interface chipset of a PSTN or DSL line card and uses an easy to implement switching of a resistor matrix as will be described below.

Referring now to FIG. 2, an embodiment of a line testing 200 will be described. The line testing includes at 202 the generating of a test signal to be applied between a first and second wire of a transmission line. The test signal is generated between a first and second test signal output such that in a first time section a first potential at the first test signal output is changed from a first value to a second value and a second potential at the second test signal output is maintained at a constant value at least during the change of the first potential. As will be described later, such a test signal can be used together with other line test signals applied in other time sections or measurement parts to determine the line parameters of the lines. Such other line test signals may include a common variation mode in which the first and second potential are varied to be at a same value. Such a mode may be referred in the following also as common mode sequence.

The line test signal may be generated such that the signal waveform of the first potential at the first test signal output is different from the second potential at the second test signal output and the common mode potential which is the sum of the potentials at the first and second signal outputs divided by two is different from a ground potential. This type of signal can also be regarded as an asymmetric differential signal.

At 204, the at least one parameter of a line signal resulting from applying the test signal in the first time section to the subscriber line 106 is measured. In embodiments, the measuring includes a measuring of the voltages and currents generated as a response to the applying of the test signal on the subscriber line 106. At 206, the measured parameter are utilized to determine at least one line test parameter based on the measured at least one parameter of the line signal. As described above, the determined line test parameters may include the three capacitances Ctg, Crg, Ctr and the three resistances Rtg, Rrg and Rtr but are not restricted to these parameters. In embodiments, the determining of the line test parameters is performed by utilizing the measured line signal parameters together with measured parameters of other line signals which are the result of applying a further line test signal to the subscriber line as described above. The applying and measuring of this further test signal can be provided prior or after the applying and measuring of the test signal in the first time section. As will be described later on, an equation system which includes the measured line signal parameters and the line test parameters to be determined can be established and can be solved by utilizing these measured parameters.

It can therefore be regarded as an aspect of embodiments that in a first measurement part at least one parameter of a first line signal is measured, the first line signal resulting from applying a line test signal such that a first potential at a first test signal output and a second potential at a second test signal output have different values at least partly during the time section in which the first test signal is applied. The line test signal here may include the line test signal of the first time section described above. In a second measurement part, at least one parameter of a second line signal is measured. The second line signal results from applying a test signal on the subscriber line with a same potential at the first and second test outputs, i.e. in a common mode sequence. By combining these two measurement parts, it becomes possible to achieve an improved measurement of line test parameters for digital subscriber lines and other wired communication lines. In some embodiments, one or more further equations which couple the parameters measured in 206 to line test parameters can be utilized to confirm or validate the determined result.

In some embodiments, a selection can be made which equations of a plurality of equations are used for calculating the line test parameters. Also, a selection can be made which equations of the plurality of equations can be used to provide the validation of the calculated result.

The selection can be used to establish an accurate measurement. It is to be noted that the line test signal applied in 202 may be a differential signal in which the potentials at the test signal outputs are not the same, i.e. the potential difference between the two signals is different from zero voltage. In addition, the line test signal may be an asymmetric differential signal in which the common mode potential is different from ground potential. The asymmetry provided by such a test signal allows in some situation an accurate measurement which would have otherwise not been possible. Such situations occur for example, when one of the wires is short-connected or has a low resistance to ground. In some embodiments, in one section of the line test signal the asymmetry is shifted to one of the signal outputs, i.e. the common mode potential is closer to the potential at one of the signal outputs than to the potential of the other, and in another section of the line signal the asymmetry is shifted to the other test signal output, i.e. the common mode potential is closer to the potential at the other of the signal outputs. Thus, the asymmetry gives the freedom to utilize one of the sections to determine the line test parameters more accurately than would have been the case by utilizing for example a symmetrical differential signal.

One embodiment in which the asymmetric differential test signal in one time section is used together with a further test signal in another time section will now be described.

An embodiment in which the further signal is implemented as a common-mode sequence is described with reference to FIG. 3a.

A Common-Mode sequence or Common-Mode signal sequence includes line a line test signal or line test signals having the same potentials at both test signal outputs. In other words, in the Common-Mode sequence the potentials at the two line test signal outputs 108a and 108b are equal.

Figure 3A:
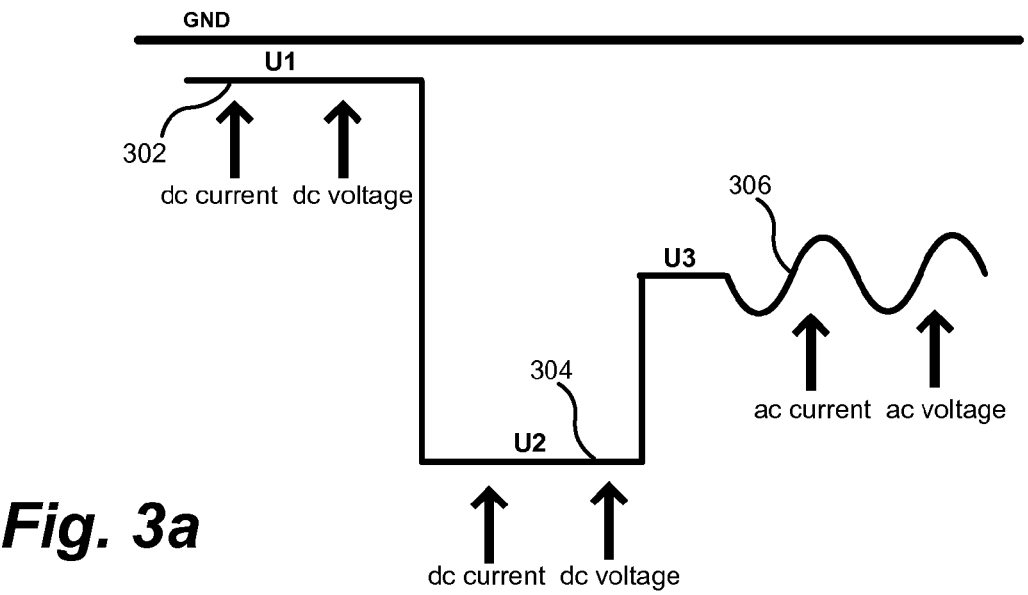
FIGS. 3a-3c show a signal waveform and circuit diagrams according to an embodiment.

FIG. 3a shows the signal waveform of the potential which is applied in the Common-Mode sequence to each of the test signal outputs 108a and 108b. The signal waveform includes a stage or section 302 in which a DC voltage U1 is applied between a respective wire and ground by maintaining the potential at the test outputs at a first predetermined level and a second section 304 in which a DC voltage U2 is applied by maintaining the potential at the test outputs at a second predetermined level. During each of the sections 302 and 304, measurements of the resulting DC voltages and the DC currents of the subscriber line are provided as indicated in FIG. 3a by arrows. Furthermore in a section 306, an AC signal swinging around a voltage U3 is supplied to each of the test signal outputs 108a and 108b by applying to each of the test signal outputs 108a and 108b a potential which varies for example in a sine waveform. Measurements are performed on the subscriber line in the section 306 to measure the AC voltage and the AC current of the resulting line signal.

Figure 3B:
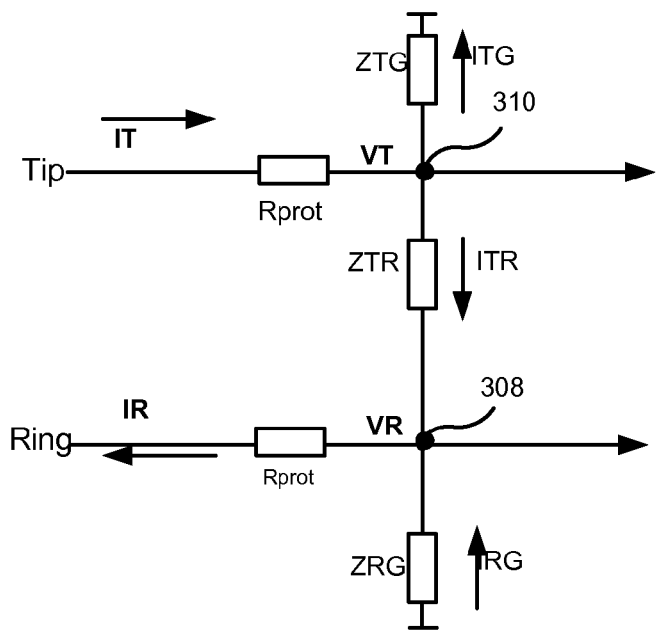

A model showing the parameters to be determined and the parameters measured during this Common-Mode sequence will now be described with respect to FIG. 3b. The model shows the current IR flowing on the Ring wire and the current IT following on the Tip wire. At a node 308, a Voltage VR which is the potential difference between the potential at node 402 and ground is measured and at a node 404 a Voltage VT is measured which is the potential difference between the potential at node 404 and ground. The resistance Rtg and capacitance Ctg which are parallel connected as shown in FIG. 1b form a complex impedance ZTR which is to be determined. Similar, the resistance Rrg and the capacitance Crg form a complex impedance ZRG which is to be determined and the resistance Rtr and the capacitance Rtr form a complex impedance ZTR which is to be determined.

In the first section 302 of the line test signal, the voltages and currents which are measured by the test unit will return the following measured parameters:

$U1tg$=Tip-Ground DC Voltage Section 1, $U1rg$=Ring-Ground DC Voltage Section 1, $I1tip$=Tip DC current Section 1, $I1ring$=Ring DC current Section 1.

In the second section 304 of the line test signal, the voltages and currents which are measured by the test unit will return the following measured parameters:

$U2tg$=Tip-Ground DC Voltage Section 2, $U2rg$=Ring-Ground DC Voltage Section 2, $I2tip$=Tip DC current Section 2, I2ring=Ring DC current Section 2.

With the above, the following parameters can be calculated:

$IT\_dc = I1tg - I2tg$, $IR\_dc = I1rg - I2rg$, $VT\_dc = U1tg - U2tg$, $VR\_dc = U1rg - U2rg$.

It is to be noted that the above values effectively are differential values constructed by subtracting the DC values serially measured at the two different voltage levels which are applied to the subscriber line. The differential values may yield in embodiments better results than a single measurement since the voltage and current offsets can be eliminated although in other embodiments absolute measurements may also be used.

In the section 306, the AC voltage is applied with a DC common mode potential, i.e. the AC voltage swings around a DC voltage. In section 306, the following parameters are measured:

$IT\_ac$=Tip wire current, $IR\_ac$=Ring wire current, $VT\_ac$=Tip-Ground AC voltage, $VR\_ac$=Ring-Ground AC voltage.

By applying the general rules for electrical networks, the following system Csys of equations with complex-value parameters can be established for the AC voltage section 306:

$$VT\_ac - Itg\_ac*Ztg = 0 \quad (C1),$$

$$VR\_ac + Irg\_ac*Zrg = 0 \quad (C2),$$

$$VT\_ac - VR\_ac - Ztr*Itr = 0 \quad (C3),$$

$$IT\_AC - Itg\_ac - Itr\_ac = 0 \quad (C4),$$

$$-Itr\_ac + IR\_ac - Irg\_ac = 0 \quad (C5).$$

In the above equations, the parameters Itg_ac, Irg_ac and Itr_ac can be eliminated to obtain the 2 node voltage equations:

$$VT\_ac*Ytg + (VT\_ac - VR\_ac)*Ytr = IT\_ac \quad (N1)$$

$$VR\_ac*Yrg + (VR\_ac - VT\_ac)*Ytr = IR\_ac \quad (N2)$$

with $Yx = 1/Zx = 1/Rx + j*2*\pi*fo*Cx$ for x=tg, rg, tr.

Similar, for the differential DC parameters IT_dc, IR_dc, VT_dc and VR_dc resulting from the DC sections 302 and 304 the following system Rsys of equations with real value parameters can be obtained:

$$VT\_dc - Itg\_dc*Rtg = 0 \quad (R1),$$

$$VR\_dc + Irg\_dc*Rrg = 0 \quad (R2),$$

$$VT\_dc - VR\_dc - Rtr*Itr = 0 \quad (R3),$$

$$IT\_DC - Itg\_dc - Itr\_dc = 0 \quad (R4),$$

$$-Itr\_dc + IR\_dc - Irg\_dc = 0 \quad (R5).$$

In the Csys system, the VT, VR, IT and IR are complex parameters including amplitude and phase which are measured by a measurement device of the test unit and are therefore known parameters in the equation system. Furthermore, the oscillation frequency f0 is known since f0 is the frequency of the AC line test signal generated by the test unit in section 306.

Thus, the five equations of Csys contain in total 3 unknown complex impedances Ztr, Ztg and Zrg to be determined together with 3 unknown currents Itr_ac, Itg_ac and Irg_ac. In a same manner, for the real value equations of Rsys, 5 equations for the 6 parameters Rtr, Rtg and Rrg and Itr_dc, I_tg_dc and Irg_dc are obtained. The 5 equations of Csys and the 5 equations of Rsys are not sufficient to determine the unknown complex parameters Ztr, Ztg, Zrg, Itr_ac, Itg_ac and Irg_ac.

In order to solve the above equation system and to determine the 3 unknown complex parameters Ztr, Ztg and Zrg which include the 6 parameters Rtr, Rtg, Rrg Ctr, Ctg and Crg to be determined in the line testing, an additional equation is required. In embodiments, the additional equation is based on the measuring of the line signals in step 206 of FIG. 2, i.e. the measuring results of the asymmetric differential test signal may be used to establish an additional equation as will be explained in the future.

As outlined above, the line test signal applied in 202 is a differential signal having an asymmetric common mode potential, i.e. a common mode potential different from the ground potential.

Figure 4A:
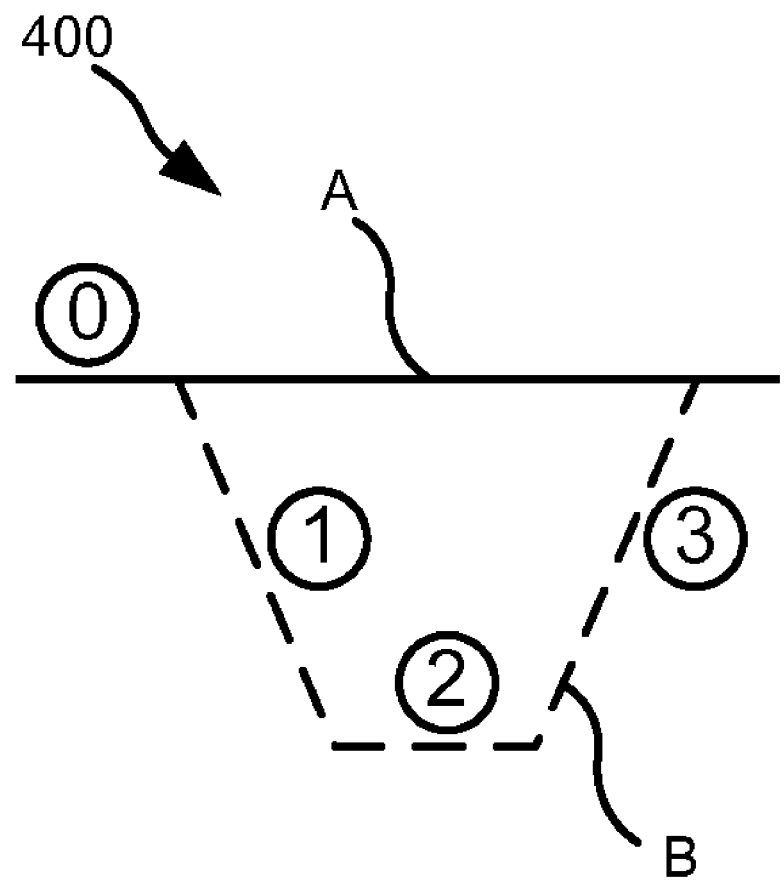
FIGS. 4a-4c show signal waveforms according to an embodiment.

The signal waveform of the differential signal having an asymmetric common mode potential may include a section in which the potential of one of the test signal outputs is held constant while the potential at the other test signal output changes by ramping up (or down) to apply a DC voltage between Tip and Ring. FIG. 4a shows a signal waveform 400 having a phase 0 in which the potentials at both test signal outputs are the same for example at the ground potential or near the ground potential. In a phase 1, the potential at one of the test signal outputs labelled in FIG. 4a with A is still held constant at the same level as in phase 0 while the potential at the other test signal output indicated by dashed lines with label B in FIG. 4a changes from the original value to a predetermined value. In a phase 2 the potential of the test signal output A is still held constant at the same potential while the test signal output B is held at the predetermined value. In a phase 3, the potential at the test signal output connected to the Ring wire is still held constant while the potential at the test signal output connected to the Tip wire changes from the predetermined value to the original value which was provided in phase 0. In a phase 4, both potentials are again at the same level as in phase 0. While in the embodiment of FIG. 4a the predetermined value of the potential in phase 2 is at a lower value than the original value in phase 0, other embodiments may include in phase 2 a higher value than the original value. In this case, instead of ramping the potential in phase 1 down, the potential may be ramped up in phase 1 to the new potential.

It can be seen from FIG. 4a that the common mode potential of the two test signal outputs is during the steady state or DC state in phase 2 asymmetric with respect to the ground potential i.e. not equal to the ground potential. The potentials at the two outputs are changed during phase 1 from a symmetric state where both are at a same level, i.e. where the common mode potential is equal to the ground potential, to a state where both potentials are asymmetric, i.e. one of the test signal outputs has a potential which is closer to the ground potential than the potential of the other test signal which results in having a common mode potential different than the ground potential. This asymmetry is then maintained during the steady state phase 2. During phase 3, the potentials are changed to bring the common mode potential again to a symmetric state where both potentials have a same level. As can be seen, in the embodiment of FIG. 4a, the test signal output maintaining the potential has a potential closer to the ground potential than the output which changes its potential from zero to the predetermined level. However, in other embodiments other waveforms may be provided.

Figure 4B:
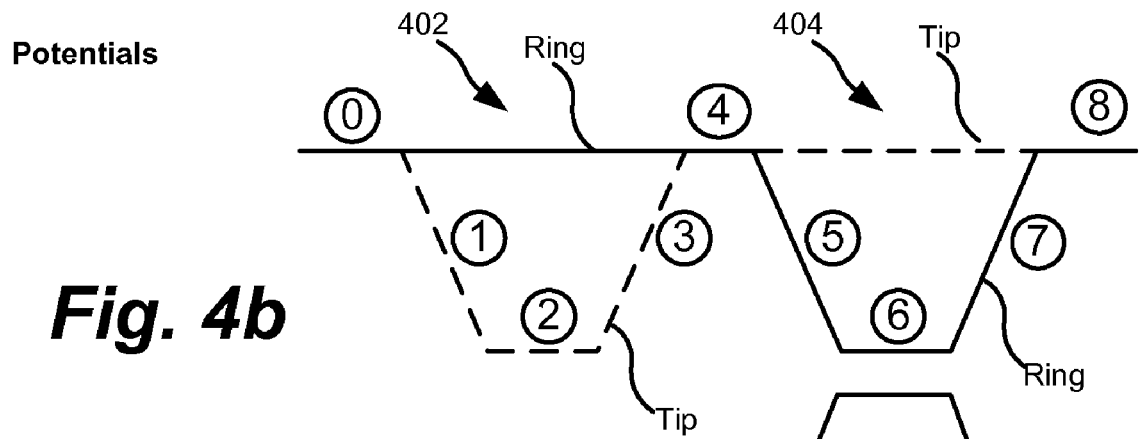

In embodiments, a further section may be provided in which the asymmetry is reversed. FIG. 4b shows an embodiment including a section with reversed asymmetry. FIG. 4b shows a section 402 which applies the waveform of FIG. 4a with the test signal output A being connected to the Ring wire and the test signal output B being connected to the Tip wire. FIG. 4b shows a section 404 in which the potentials are applied in a reversed manner to the Ring and Tip wire. In other words, section 404 includes a phase 5 in which the potential of the test signal output connected to the Ring wire is no longer maintained constant as in the section 402 but is ramped down to the predetermined value. The potential of the test signal output connected to the Tip wire is provided constant at or near the ground potential during phase 5. In a phase 6, the potentials of both test signal outputs are held constant at their respective levels in order to apply a positive DC voltage between Tip and Ring wire signal outputs. In a phase 7, the potential at the test signal output connected to the Tip wire is still held constant while the potential at the test signal output connected to the Ring wire ramps up to the original value. In a phase 8, both potentials are again the same.

Figure 4C:
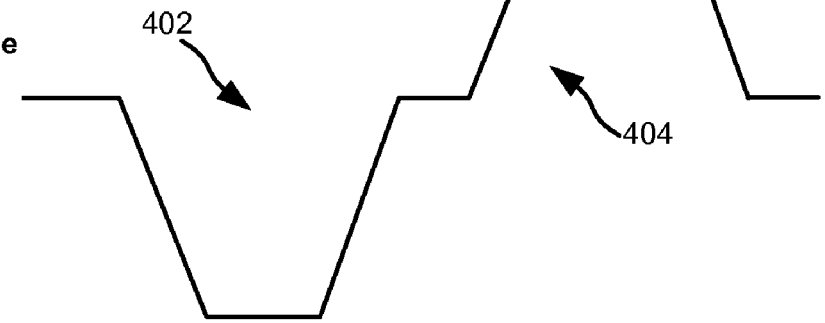

FIG. 4c shows the voltage between the Tip and Ring signal outputs resulting from the potentials applied in FIG. 4b. It can be seen that in section 402 the voltage between the Tip and Ring signal outputs ramps down from zero to a negative voltage level which is then maintained during phase 2 while in section 404 the voltage ramps up from zero to a positive voltage which is then maintained during phase 6. Thus, the waveform of the voltage between the Tip and Ring signal outputs in section 404 is reverted to the waveform in section 402.

The potential level at which the respective test signal outputs are maintained constant during the sections 404 and 406 is in embodiments the ground potential or close to the ground potential, for example equal or smaller than 15% of the maximum voltage applied between the Tip and Ring wire. However, in other embodiments other values of this constant potential may be possible, for example a constant potential which is equal or lower than 20% of the maximum voltage applied between the Tip and Ring wire.

The ramping of the voltage avoids voltage steps and is therefore suitable for xDSL operation where x stands as a placeholder for a specific DSL transmission such as ADSL, VDSL etc. For PSTN system, the ramps avoid that the remote phone rings or generate tinkling noise. The ramp's slope and the level of the steady state voltages during phases 2 and 6 can be selected according to design or other requirements. Although in the above embodiments, the ramps drive the voltage from ground to a negative Voltage and back to ground, the sequence might be applied for positive voltages as well. The ramps may also be used for measurements, because the voltage ramps applied to capacitances generate a DC current that can be measured. The internal generator's DC and AC voltage are known. In the section 402, the Ring wire's potential is hold constant while the Tip wire's potential is performing a ramp and in section 404 the Tip wire's potential is hold constant while the Ring wire's potential is performing a ramp, which allows simplifying the external network, so that a simple relation between the resistances can be found. For example, in section 402, the Rrg resistance is parallel to the known Rprot. The parallel connected arrangement can be considered in series with Rtr, while this serial arrangement is again parallel with Rtg. In view of this situation, we can get a relatively "simple" equation to complete the common mode sequence measurements as will be described in more detail below.

Both of the modes of sections 402 and 404 may be used for determining the line test parameters. In embodiments, the test unit may decide to alternatively use the results arising from the measurements within section 402 or the results arising from the measurements within the section 404 or both of these results. This decision or selection may be based on predetermined information or may be done by other criteria. The decision may take into account which one of the measurements leads to the most accurate results. Furthermore, in some embodiments, both results may be processed to obtain accurate values of the line testing parameters Rtr, Rtg, Rrg Ctr, Ctg and Crg. Processing of both results leads to more information and therefore a crosscheck of the results is possible by utilizing one of the measurement results. Thus, by utilizing more than one of the sections 402 and 404 of the differential test signal, a high degree of freedom is obtained in addition to the additional possibility of verifying the determined line test parameters.

In addition to the asymmetric differential sections 402 and 404 which can be considered as DC-voltage sections since it contains phases 2 and 6 in which the voltage level is maintained constant, a further line test signal section including AC signals may be applied and used for establishing the additional equation required to obtain the six 6 parameters Rtr, Rtg, Rrg Ctr, Ctg and Crg from the equation systems Csys and Rsys as outlined above.

Figure 5A:
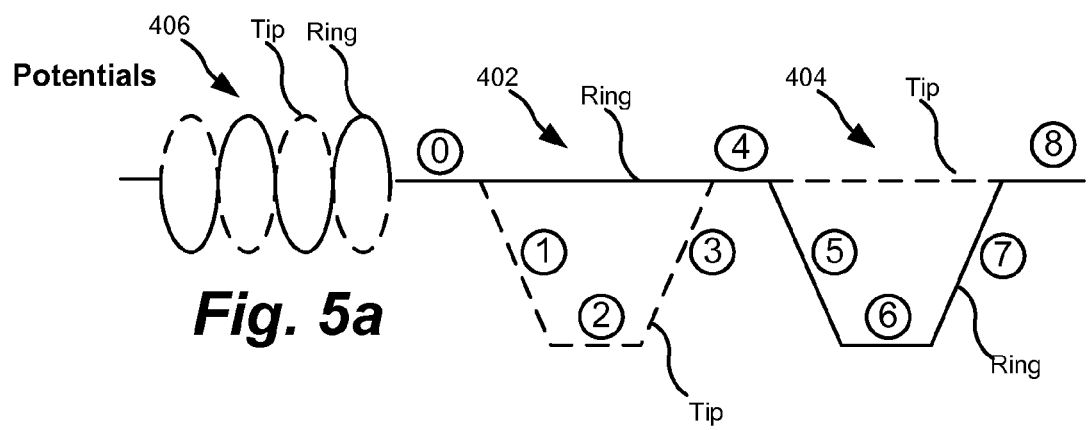
FIGS. 5a and 5b show signal waveforms according to an embodiment.
Figure 5B:
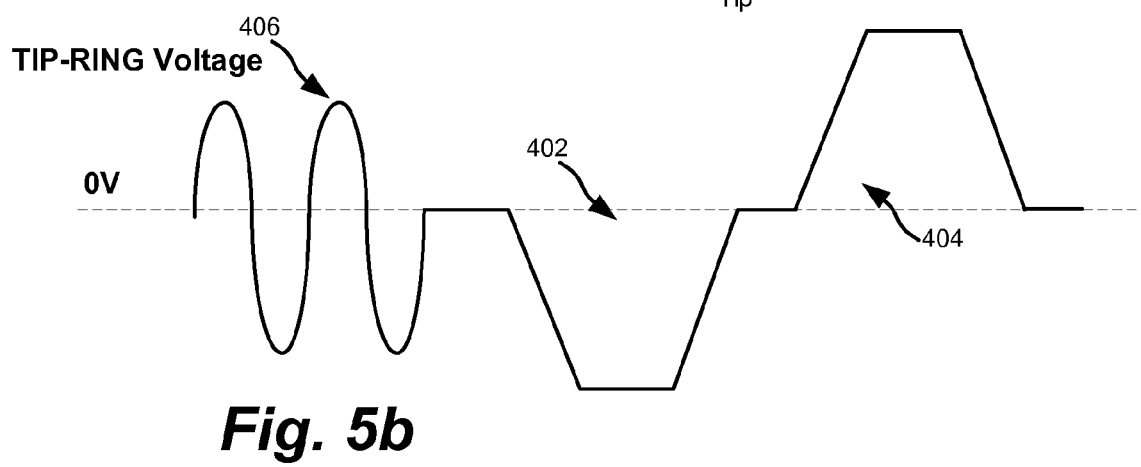

FIGS. 5a and 5b shows an embodiment in which an AC section 406 of the line test signal is provided at the test signal outputs prior to the sections 402 and 404. FIG. 5a shows in addition to the potential waveforms already described with respect to FIG. 4a the potential waveform of the AC section 406. The AC section 406 shown in FIG. 5a is a differential signal with a common mode potential equal to the ground potential. The AC waveform of the potentials may be a sine waveform although other embodiments may use other waveforms. FIG. 5b shows the voltage between the Tip and Ring signal outputs resulting from the potentials applied in FIG. 5a. It can be seen that in the AC section 406, the AC voltage generated between the Tip and Ring signal outputs is symmetrically swinging around 0 Volt. The frequency of the test signal in the AC section can be the same as the frequency of the AC signal provided in the common mode part as described above. The amplitude of the AC signal can be of any value and may for example be selected to provide sufficient accuracy without overloading the Test Unit.

In embodiments, the differential Tip-Ring voltage Vtr= (Vt−Vr) is measured "after" the resistances 114a and 114b, respectively, i.e. on the side opposed to the test unit. Furthermore, in embodiments, the resistance and the Tip-Ring current Itr is measured in amplitude and phase.

In the following, it is described how the additional equation which is required to solve the equations systems Csys and Rsys is obtained for the sections 402, 404, and 406 of the differential test signal.

Similar, if one applies the above for the DC situation during phases 2 or 6 of sections 402 and 404, respectively, the measured resistance Rtot is obtained by Rtot=Vtr_DC/Itr_DC.

The resistance Rtot is a function of all the 3 unknown resistances Rtr, Rtg and Rrg. Thus, $$Rtot=Rtr*(Rtg+Rrg)/(Rtg+Rtr+Rrg).$$

With this additional equation obtained and the above described equation systems Csys and Rsys, it is possible to provide with the measurements in the common-mode part and the differential part a set of equations which allows to calculate the resistances and capacitances Rtr, Rtg, Rrg, Ctr, Ctg, Crg.

Figure 3C:
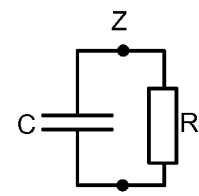

In other embodiments, a set of equations in the unknown Ztg, Ztr and Zrg variables may be defined. Since the complex impedance is provided by the respective resistors and capacitances parallel connected as shown in FIG. 3c, it will be again possible to calculate the resistances and the capacitances. Similar to the DC measurement, with the measured Tip-Ring voltage Vtr and the measured Tip-Ring current Itr in the AC measurement, the complex impedance Ztot is obtained by Ztot=Vtr/Itr.

The Ztot is a function of all the 3 unknown impedances Ztr, Ztg and Zrg. In more detail the Ztot is obtained as $$Ztot=Ztr*(Ztg+Zrg)/(Ztg+Ztr+Zrg).$$

In each case, the processor of the test unit may apply different processing methods to solve the equations, for example the Least Square, the Total Least Square or a linear system, where for example 3 independent equations in the unknown variables Ztg, Ztr and Zrg have to be solved. The "independency" of the equations is guaranteed by the possibility of combining different measurements strategies, i.e. common mode, differential mode, AC signals, DC signal, each one providing its own information, i.e. currents and voltages, about the subscriber line.

While in the embodiment of FIGS. 5a and 5b the AC signal is applied as a symmetric signal in a separate section 406, the AC signal section may be included in the DC mode sections 402 and 404 in other embodiments.

Figure 6A:
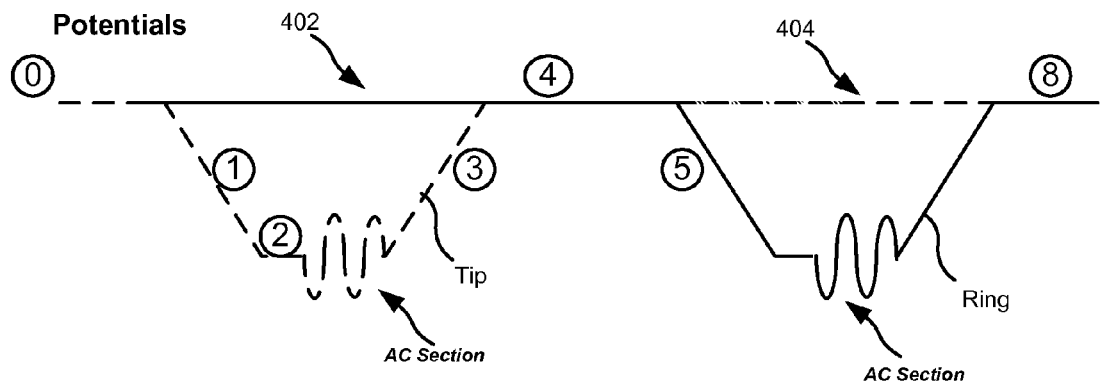
FIGS. 6a and 6b show signal waveforms according to an embodiment.
Figure 6B:
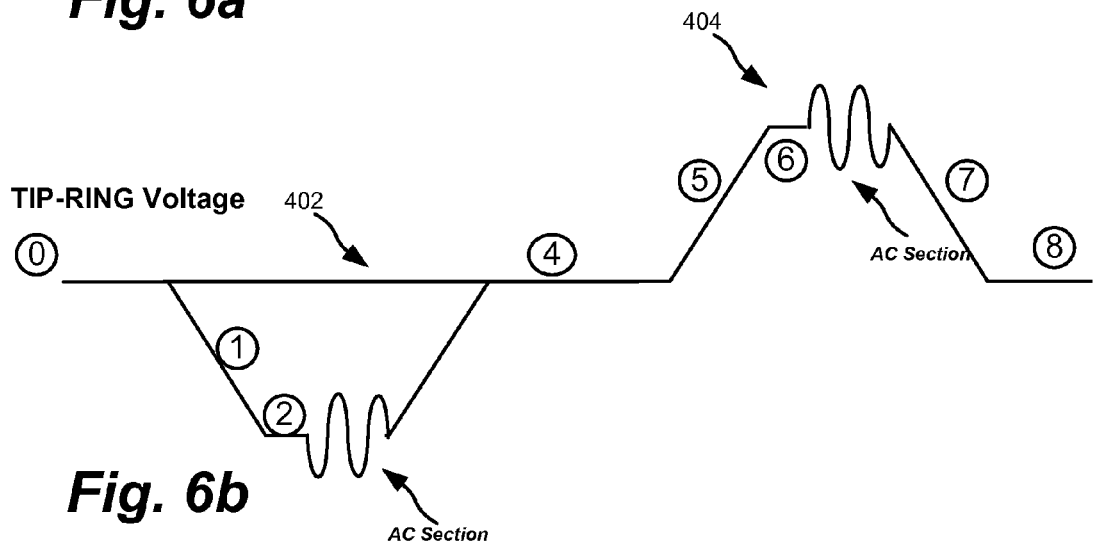

FIGS. 6a and 6b show an embodiment in which the AC signal is incorporated into the DC-mode sections 402 and 404. As can be seen in FIG. 6a, the section 402 is now modified such that phase 2 contains one time interval in which the predetermined potential level is maintained for a predetermined time and a second time interval in which the signal starts oscillating around the predetermined potential level in order to generate a differential AC signal which is asymmetric. Similar to phase 2, phase 6 of section 404 has been modified to have one time interval in which the predetermined potential level is maintained for a predetermined time and a second time interval in which the signal starts oscillating around the predetermined potential level in order to generate a differential AC signal which is asymmetric. While the embodiment of FIG. 6a shows the absolute value of the predetermined potential levels of phase 2 and phase 6 to be equal, other embodiments may use different absolute values for the predetermined potential levels of phase 2 and phase 6.

FIG. 6b shows the voltage generated between the Tip and Ring test signal outputs resulting from the potentials of FIG. 6a.

Figure 7A:
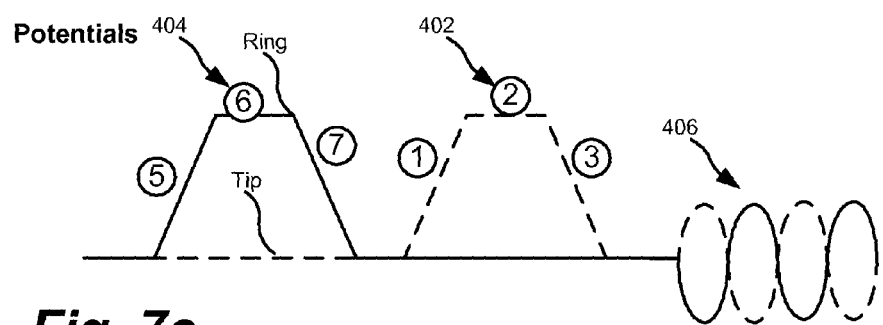
FIGS. 7a and 7b show signal waveforms according to an embodiment.
Figure 7B:
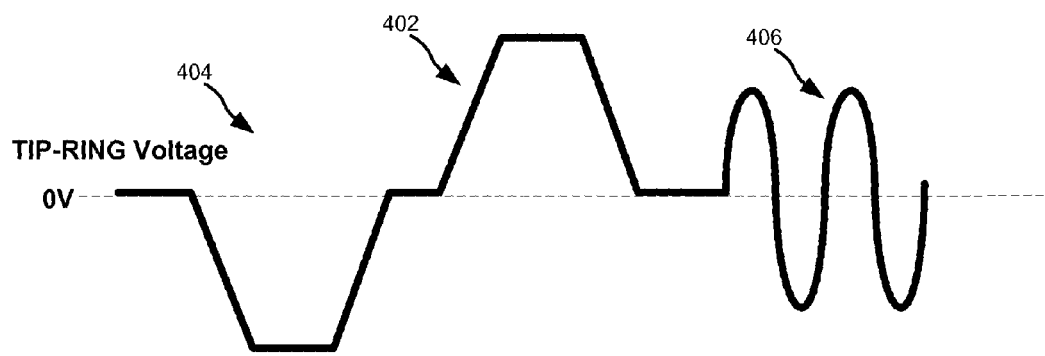

A further embodiment is shown in FIGS. 7a and 7b. In this embodiment, the section 402 in which the Ring potential is held constant and the section 404 in which the Tip potential is held constant are interchanged and the AC section 406 is performed after the sections 402 and 404. Furthermore, compared to the embodiment of FIG. 5, the signal waveform in sections 402 and 404 are reversed, i.e. the respective potentials are ramped-up in phases 1 and 5 and ramped-down in phases 7 and 3. FIG. 7b shows the voltage waveform between the Tip and Ring test signal outputs resulting from the potential waveform of FIG. 7a.

Figure 8A:
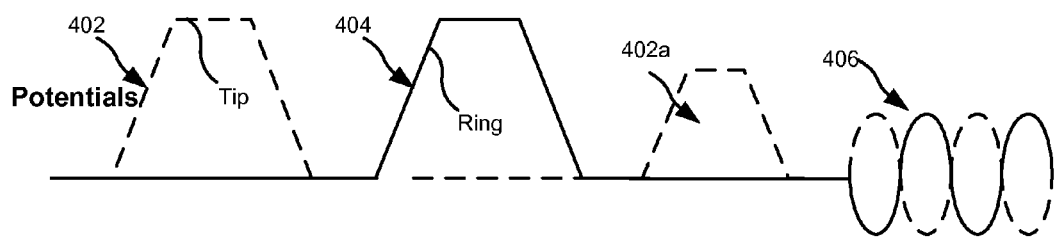
FIGS. 8a and 8b show signal waveforms according to an embodiment.
Figure 8B:
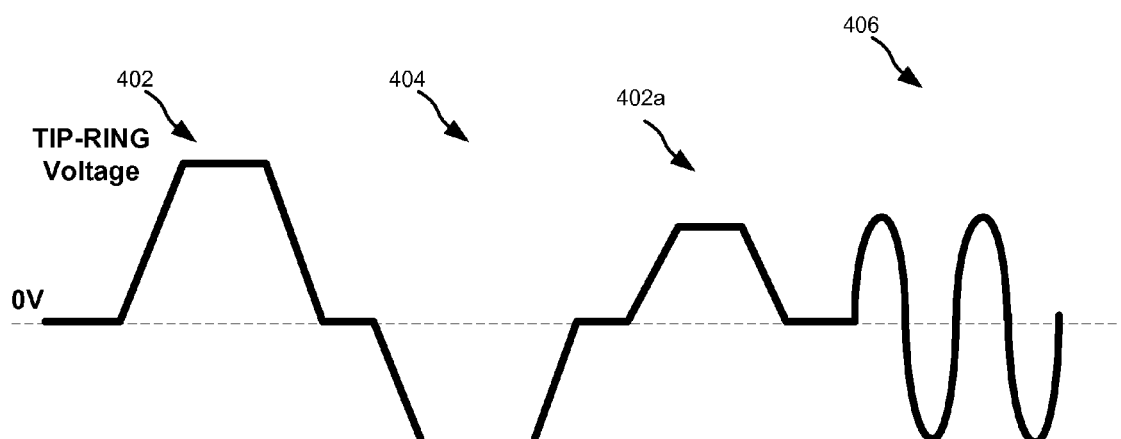

FIGS. 8a and 8b show a further embodiment wherein a further section 402a is following the sections 402 and 404. Similar to section 402, section 402a is a section in which the potential of the Ring wire signal output is maintained constant. However, the level of the potential to which the Ring wire signal output is ramped-up is smaller in section 402a than in section 402.

FIG. 8b shows the voltage waveform between the Tip and Ring test signal outputs resulting from the potential waveform of FIG. 8a.

It is to be understood that the embodiments shown above are only some examples of combining one or more sections in which the Tip wire potential is held constant with one or more sections in which the Ring wire potential is held constant.

Figure 9A:
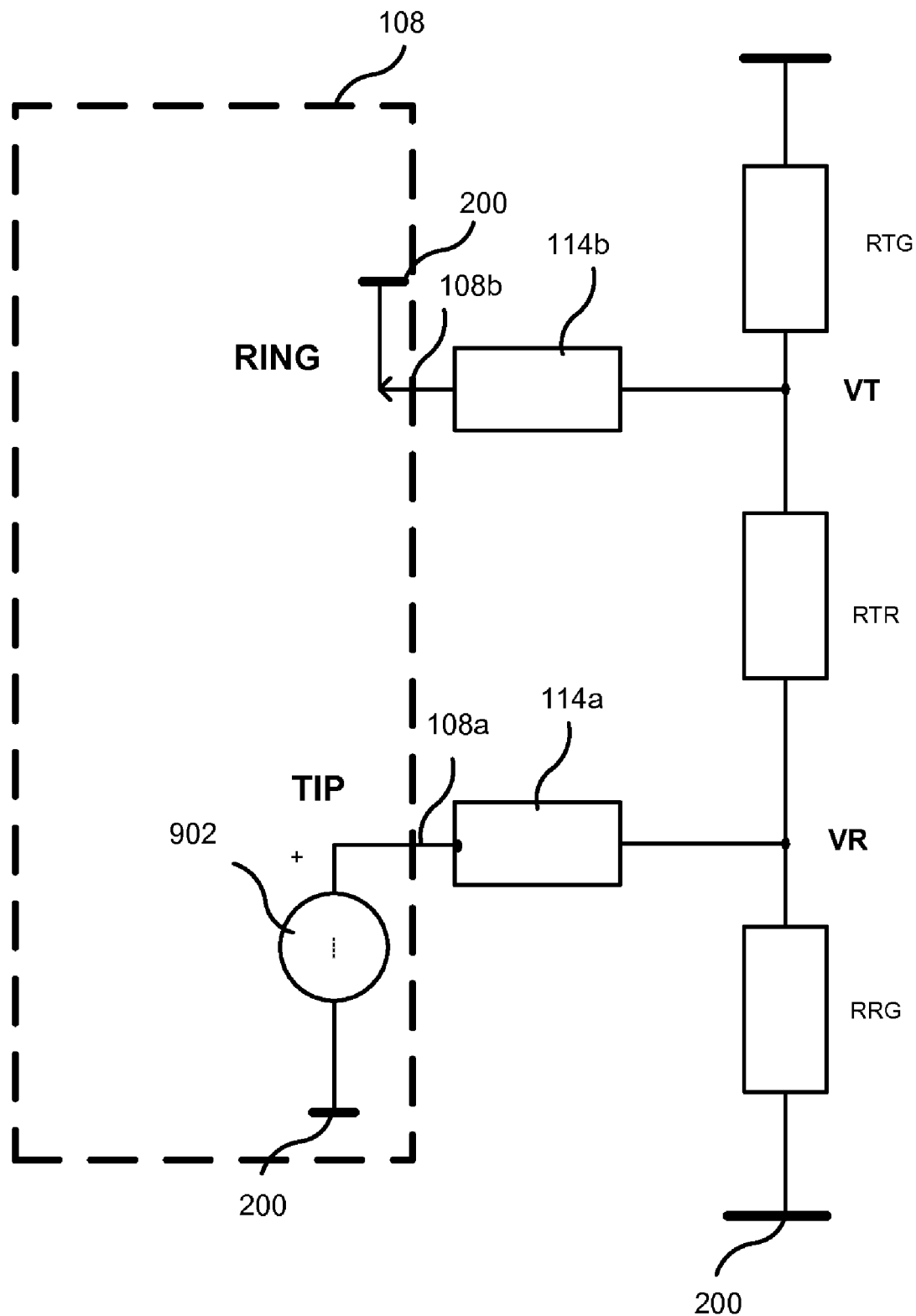
FIGS. 9a-9c show embodiments of a test unit.

Referring now to FIG. 9a, a set-up of the test unit 108 is shown to provide a generation of a signal waveform for the section 402 in which the Ring potential is held constant. A voltage generator 902 is connected with a first terminal to ground 200 and with a second terminal via the test signal output 108a to a first terminal of the resistor 114a. The resistor 114a is connected with its other terminal to the Tip wire.

The resistor 114b is connected at a first terminal to ground 200 and at a second terminal to the Ring wire. The resistors 114a and 114b can be regarded as coupling and protection resistors for connecting to the respective Ring and Tip wire and further providing protection for the test unit. The voltage generator 902 is capable of supplying a programmable variable voltage between the respective two ends, i.e. in FIG. 9a between the Ring wire signal output 108a and ground 200 in order to provide the waveforms of the test signal in the section 402 having the Ring wire on constant potential. Furthermore, since the Ring wire signal output 108b is connected to ground 200, the potential at the Ring wire signal output 108b is maintained constant at the ground potential.

Figure 9B:
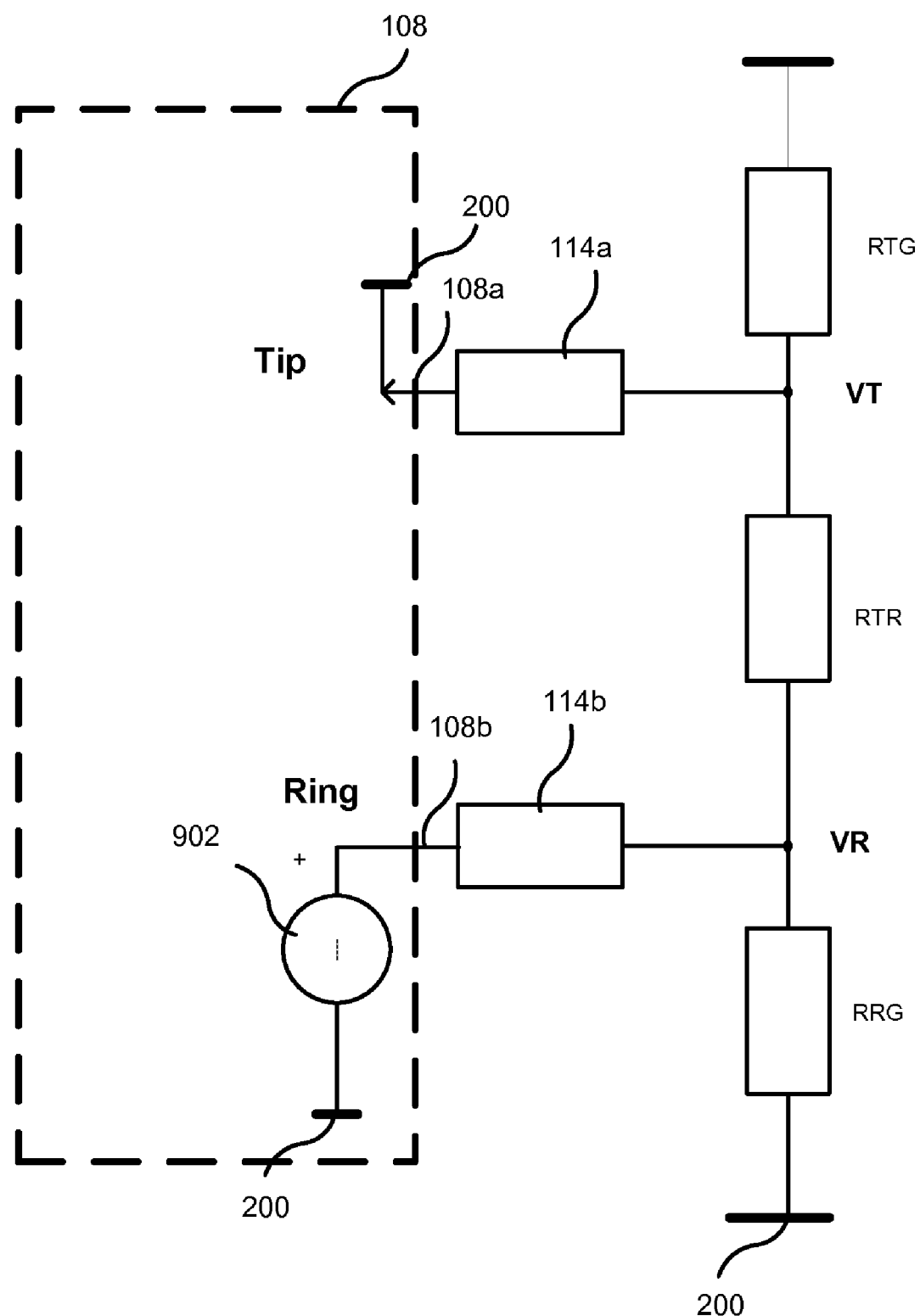

FIG. 9b shows a set-up of the test unit 108 to provide a generation of a signal waveform for the section 404 in which the Tip wire is held at a constant level. As can be seen from FIG. 9b, the second terminal of the voltage generator 902 is connected via the test signal output 108b to the first terminal of the resistor 114b. Furthermore, the first terminal of the resistor 114a is connected to ground and the second terminal of the resistor 114a is connected to the Tip wire. Since the Tip wire signal output 108a is connected to ground 200, the potential at this signal output is maintained constant at the ground potential.

Figure 9C:
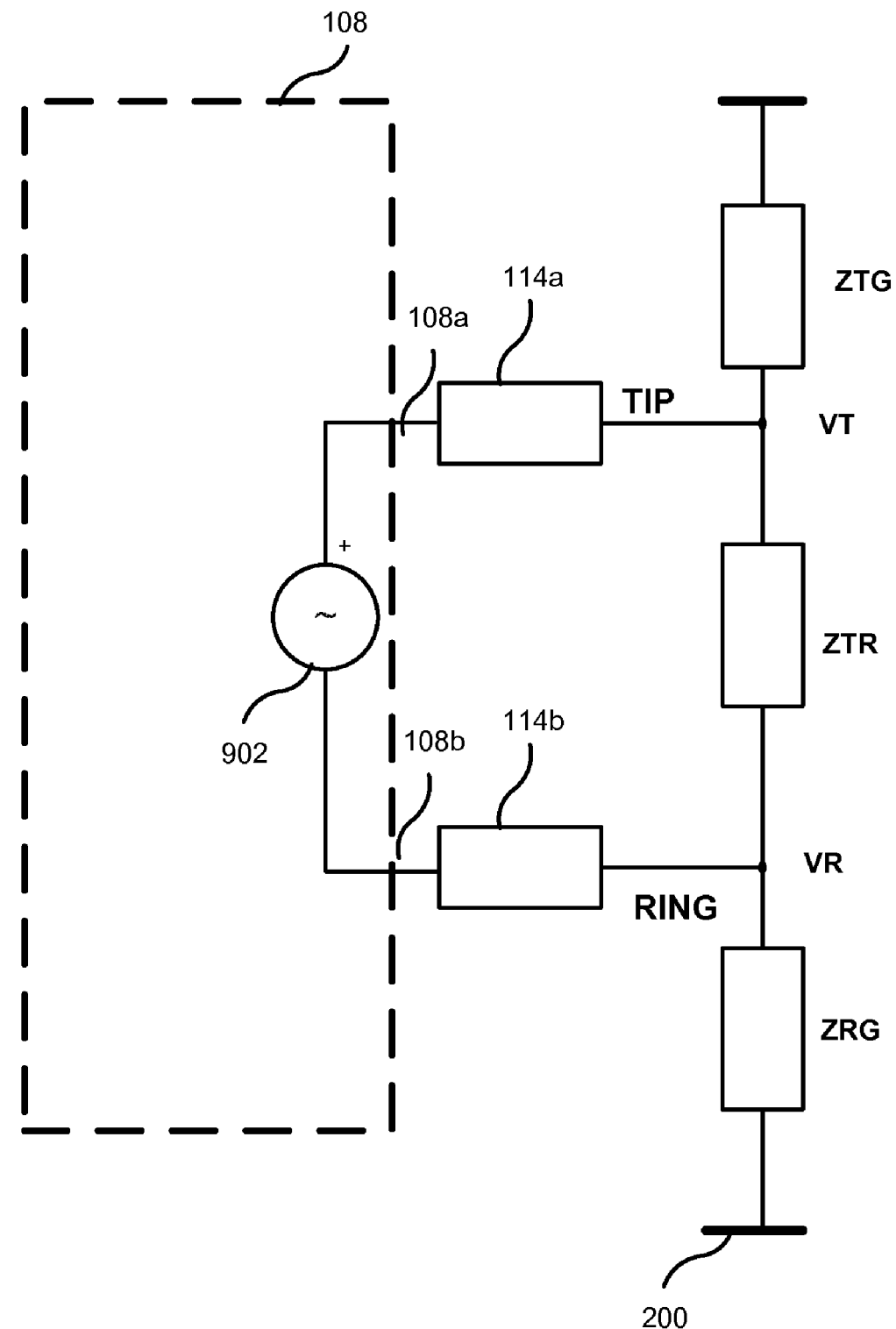

FIG. 9c shows a set-up of the test unit 108 to provide a generation of the AC section 406. As can be seen, the voltage generator 902 is connected with its first terminal via the resistor 114b to the Ring wire. The second terminal of the voltage generator 902 is connected via the resistor 114a to the Tip wire.

The set-ups shown in FIGS. 9a-c can be provided by switching the terminals of the voltage generator 902 to connect either to one of the resistors 114a and 114b and ground. It is further to be understood that the set-ups shown are only of exemplary nature and other embodiments include other setups for providing the sections 402, 404 and 406 of the differential test signal.

Figure 10:
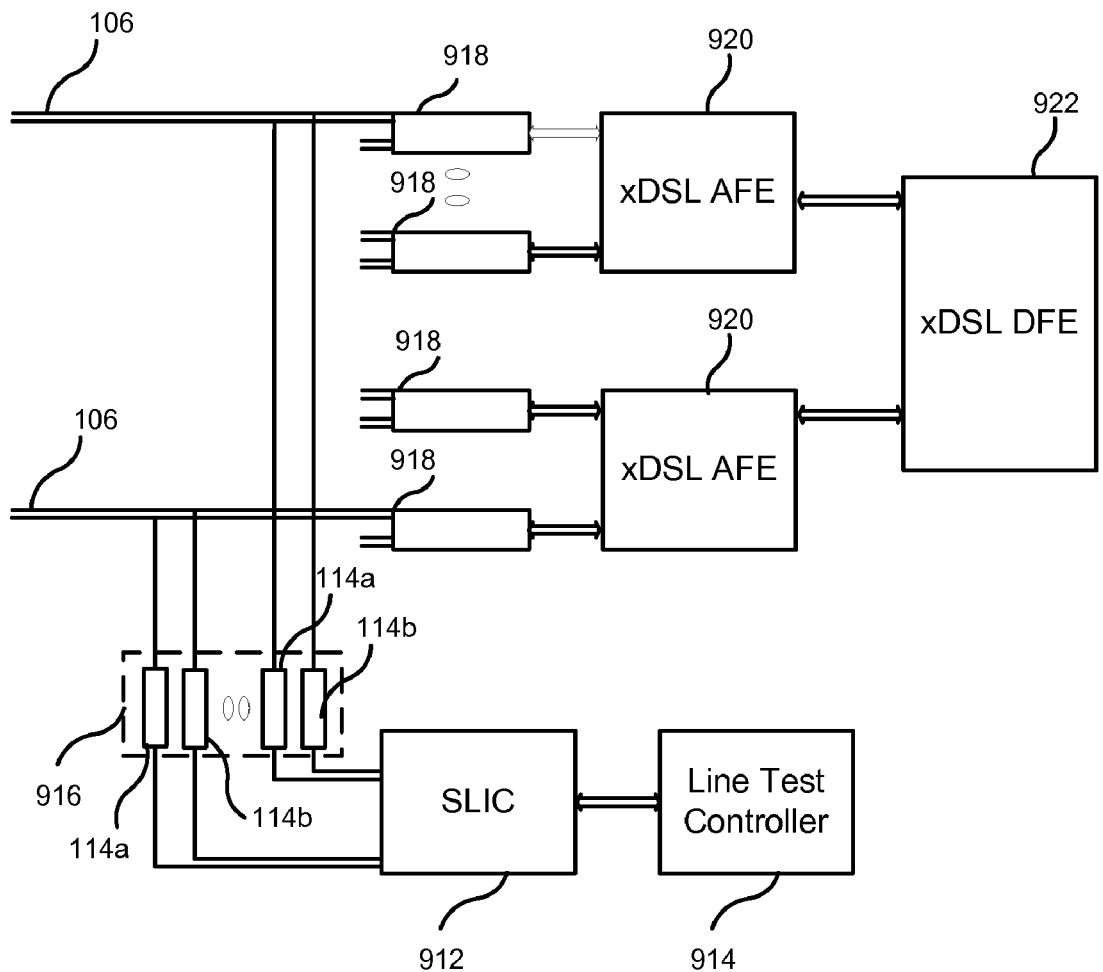
FIG. 10 shows a DSL system according to an embodiment.

The test unit 108 can be provided as external test unit or can be incorporated into a chip set provided for the subscriber line. FIG. 10 shows a DSL system 910 in which the test unit 108 is provided on-chip by incorporating the MELT testing as described above into a chip set. In the system of FIG. 10, the MELT test functionality is implemented by a SLIC chip 912 (Subscriber Line Interface Circuit) and a Line Test Controller Chip 914 for controlling the generating of the test voltage signal. SLIC chip 912 and Line Test Controller Chip 914 are coupled to bidirectional communicate with each other. Line Test Controller 914 controls the generation of the test signal by SLIC Chip 912. SLIC Chip 912 has a multiplexing capability to provide the test signal generated by the SLIC chip 912 to a selected one of a plurality of DSL lines 106. The DSL system includes a resistor matrix with a plurality of resistors 114a and 114b. By switching the terminals of the voltage generator to selected ones of the resistors 114a and 114b, a respective DSL line 106 can be connected to the voltage generator of SLIC chip 912 via the resistors. Each of the DSL lines is further coupled to one of a plurality of line drivers 912 to transmit and receive DSL signals on the plurality of lines 106. Each line driver 918 is further coupled to one of a plurality of analog front end chips 920 for providing the analog processing of the DSL signals. The analog front end chips are coupled to a digital front end chip 922 for digital processing the DSL signals.

The system of FIG. 10 provides a complete test programme implemented on-chip since in addition to the above explained MELT (metallic line testing) provided by SLIC chip 912 and Line Test Controller Chip 914, SELT (Single-ended line testing) and DELT (Dual-ended line testing) can be provided by the front end chips 920 and digital front end chip 922.

Figure 11:
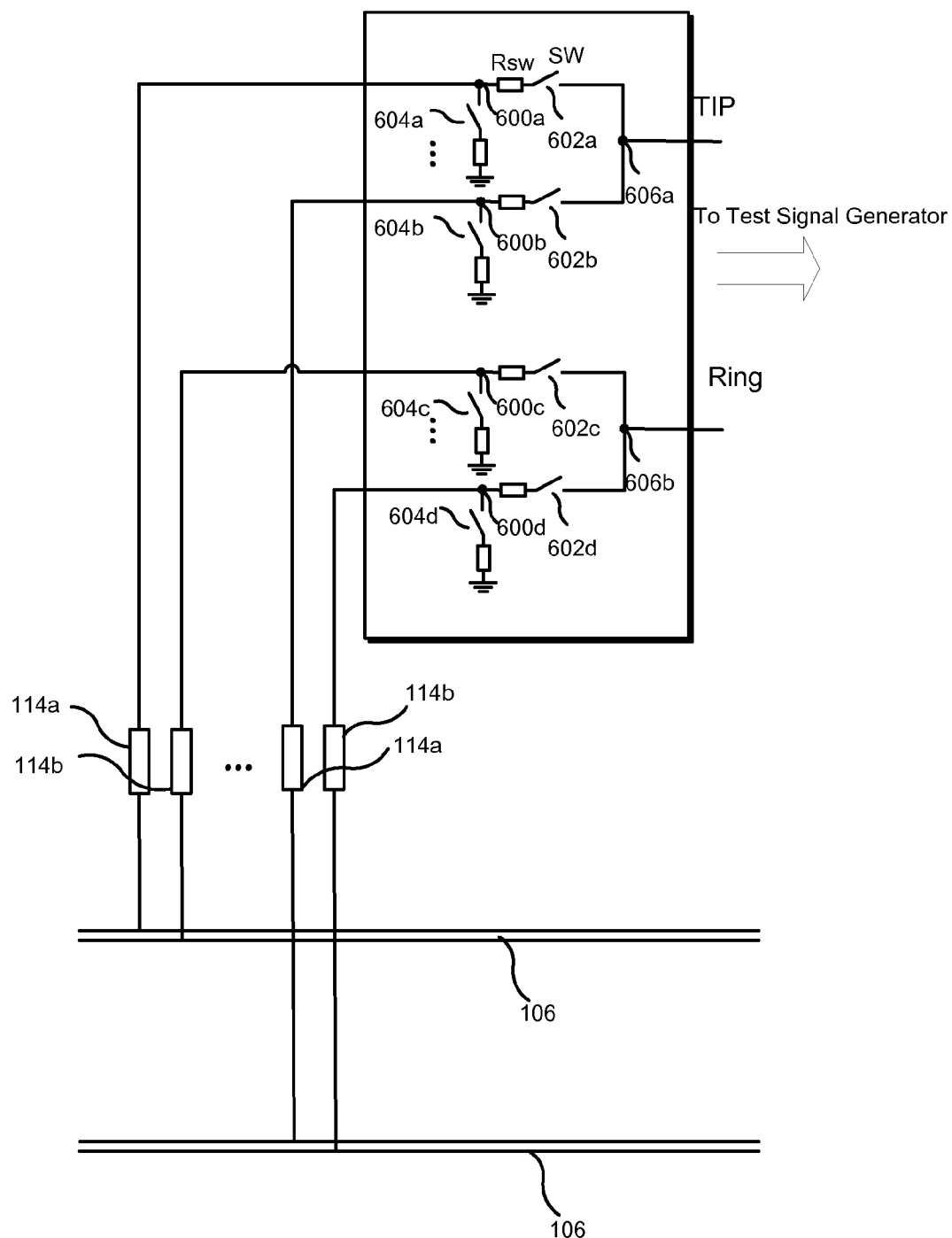
FIG. 11 shows a switch device according to an embodiment.

Referring now to FIG. 11, an embodiment of a switching device provided to switch the resistors 114 will be described. The switching device according to FIG. 11 includes a first plurality of switches 602a-d, each connected at a first end to a corresponding one of nodes 600a-d. The plurality of switches may be also regarded as a switch matrix. Each of the nodes 600a-d is connected to a respective one of the plurality of resistors. A first group of the switches from the first plurality of switches, which are in the embodiment of FIG. 11 the switches 602a and 602b, is provided for switching the Tip wires of the digital subscriber lines and a second group of switches from the first plurality of switches, which are in the embodiment of FIG. 11 the switches 602c and 602d, is provided for switching the Ring wires of the digital subscriber lines. At a second end, the first group of the switches is connected with a node 606a, which is connected to a first output of the signal generator for providing the signal to the Tip wire connected by switching device, and the second group of the switches is connected to a second node 606b, which is connected to a second output of the signal generator for providing the signal to the Ring wire connected by switching device.

The switching device comprises a second plurality of switches 604a-d, each being connected at a first end with a respective one of the nodes 600a-d. At a second end, each of the switches 604 is connected to ground. The switches of the first and second plurality of switches may be implemented by any known type of switches, including semiconductor 3-port devices such as bipolar or field effect transistors etc.

An exemplary controlling of the first and second switches will be explained in the following. When the switching device is switched into a first state, a first switch 602a of the first group of switches and a corresponding second switch 602c of the second group of switches is switched to "on", so that the two outputs of the signal generator are connected with the Tip and Ring wires of a first digital subscriber line. The other switches of the first plurality of switches, which are in the embodiment of FIG. 11 the switches 602b and 602d, are in the first state switched to "off" in order to disconnect the wires of all other digital subscriber lines from the signal generator. The two switches 604a and 604c of the second plurality of switches, which are connected to the Tip and Ring wires of the first digital subscriber line, are further switched to "off" in the first state, so that the Tip and Ring wires of the first digital subscriber line are disconnected from ground. All other switches of the second plurality of switches, i.e. switches 604b and 604d are switched to "on", so that the Tip and Ring wires of the other digital subscriber lines are connected to ground.

In a second state, another switch from the first group, which is in the embodiment of FIG. 11 the switch 602b, and a corresponding switch from the second group of switches, which is in the embodiment of FIG. 11 the switch 602d, is switched to "on", so that the two outputs of the signal generator are connected with the Tip and Ring wires of a second digital subscriber line. All other of the first plurality of switches, which are in the embodiment of FIG. 11 the switches 602a and 602c, are switched to "off" in the second state to disconnect the wires of all other digital subscriber lines from the signal generator. The two switches 604b and 604d of the second plurality of switches, which are connected in the second state to the Tip and Ring wires of the second digital subscriber line, are further switched to "off" in order to disconnect the Tip and Ring wires of the second digital subscriber line from ground. All other of the second plurality of switches, which are in the embodiment of FIG. 11 the switches 604a and 604c, are switched to "on", so that the Tip and Ring wires of the other digital subscriber lines are connected to ground.

The switching from the first to the second state is performed in such a way, that the two switches of the first and second plurality of switches, which are connected to the same wire, are not both in an "off" state at the same time. This secures, that during switching the respective wire of the digital subscriber line always has a low-impedance connection to either ground or the signal generator via the respective switch resistance. Therefore, in the transition from the first state to the second state, before the first and second switches 602a and 602c are switched from "on" to "off", the respective switches 604a and 604c, which are coupled to the first and second switches 602a and 602c, are switched from "off" to "on". Then the respective wire is connected for a short time to both ground and the signal generator. In the same way, the third and fourth switches 602b and 602d are switched from "off" to "on", before the switches 604b and 604d, which are connected to the third and fourth switches 602b and 602d, are switched from "on" to "off".

By implementing the switches of the first and second plurality of switches in such a way, that the value of the resistance during "on" is significantly lower than the value of the resistors 114a and 114b, the above described switching with overlap between the switching states results in a nearly unchanged impedance of the subscriber line, not depending on whether the line is connected to or disconnected from the signal generator. This allows providing in addition to the line testing also a sealing current by using the same voltage generator. Line testing and sealing current can be provided fully independent and simultaneous with the transmission of data on the digital subscriber line.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "entity" or "unit" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling unless otherwise stated.

It is further to be noted that embodiments described in combination with specific entities may in addition to an implementation in these entity also include one or more implementations in one or more sub-entities or sub-divisions of said described entity. For example, specific embodiments described herein described herein to be implemented in a transmitter, receiver or transceiver may be implemented in sub-entities such as a chip or a circuit provided in such an entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended.

It is further to be noted that methods disclosed in the specification or in the claims may be implemented by a device having means for performing each of the respective steps of these methods.

What is claimed is:

1. A method comprising:
    generating by a signal generator device a test signal to be applied between a first and second wire of a transmission line, wherein the test signal is generated between a first and second test signal output such that in a first time section a first potential at the first test signal output is changed from a first value to a second value and a second potential at the second test signal output is maintained at a constant value at least during the change of the first potential;
    generating the test signal during a second time section such that the first potential at the first output and the second potential at the second output are oscillating with a predetermined frequency;
    measuring at least one parameter of a line signal, the line signal resulting from applying the test signal to the transmission line; and
    determining at least one line test parameter based on the at least one parameter of the line signal.

2. The method according to claim 1,
    wherein in a third time section the test signal is generated between the first and second test signal output such that the second potential at the second test signal output is changed from a third value to a fourth value and the first potential at the first test signal output is maintained at a constant value during the change of the second potential.

3. The method according to claim 2, wherein in the third time section for a time period after the change from the third to the fourth value, the second potential at the second test signal output is provided constant at the fourth value or is oscillating around the fourth value with a predetermined first frequency.

4. The method according to claim 2, wherein the method comprises:
    measuring at least one first parameter of a line signal resulting from applying the test signal during the first time section on the subscriber line;
    measuring at least one second parameter of a further line signal resulting from applying the test signal during the second time section on the subscriber line; and
    selecting the at least one first parameter to be used for determining the at least one line parameter and selecting the at least one second parameter to be used for verifying the determined at least one line test parameter.

5. The method according to claim 1, wherein in the first time section the second potential at the second test signal output is equal or close to a ground potential.

6. The method according to claim 5, wherein the constant value of the second potential is in absolute value equal or smaller than 15% of the absolute value of the voltage between the first and second test outputs.

7. The method according to claim 1, wherein the first value of the first potential and the constant value of the second potential are the same.

8. The method according to claim 1, wherein in the first time section for a time period after the change from the first to the second value, the first potential at the first test signal output is provided constant at the second value or is oscillating around the second value with a predetermined first frequency.

9. The method according to claim 1, wherein, during the oscillating in the third time section, the first potential and the second potential have opposed signs.

10. The method according to claim 1, wherein the method comprises:
    generating in a further time section the test signal, such that the first potential at the first test output and the second potential at the second test output are at a same value; and
    measuring at least one parameter of a further line signal resulting from the test signal in the further time section; and
    determining the at least one line test parameter by utilizing the at least one parameter of the line signal and the at least one parameter of the further line signal.

11. The method according to claim 10, wherein the at least one parameter of the line signal and the at least one parameter of the further line signal include one or more of the parameters of the group of parameters comprising:
    a DC voltage between the first wire and ground,
    a DC voltage between the second wire and ground,
    an AC voltage between the first wire and ground,
    an AC voltage between the second wire and ground,
    a DC current flowing in the first wire,
    a DC current flowing in the second wire
    an AC current flowing in the first wire, and
    an AC current flowing in the second wire.

12. A test signal generating device comprising:
    a first test signal output;
    a second test signal output;
    a signal generator to generate a test signal to be applied to a first and second wire of a subscriber line, wherein the signal generator is configured to generate the test signal at the first and second test signal outputs in a first time section such that a first potential at the first test signal output is changed from a first value to a second value and a second potential at the second test signal output is maintained constant at least during the change of the first potential, the signal generator further configured to generate the test signal during a second time section such that the first potential at the first output and the second potential at the second output are oscillating with a predetermined frequency.

13. The device according to claim 12, wherein the signal generator is configured to generate in a third time section the test signal between the first and second test signal output such that the second potential at the second test signal output is changed from a third value to a fourth value and the first potential at the first test signal output is maintained at a constant value at least during the change of the second potential.

14. The device according to claim 13, wherein the device is configured to provide the test signal such that in the third time section for a time period after the change from the third to the fourth value, the second potential at the second test signal output is provided constant at the fourth value or is oscillating around the fourth value with a predetermined first frequency.

15. The device according to claim 12, wherein in the first time section the potential of the second test signal output is equal or close to a ground potential.

16. The device according to claim 12, wherein the device is configured to provide the test signal such that in the first time section for a time period after the change from the first to the second value the first potential at the first test signal output is provided constant at the second value or oscillating around the second value with a predetermined first frequency.

17. The device according to claim 12, wherein the device comprises a measuring circuit, the measuring circuit being configured to
measure at least one first parameter of a line signal resulting from applying the test signal during the first time section on the subscriber line;
to measure at least one second parameter of the line signal resulting from applying the test signal during the second time section on the subscriber line; and
and to select the at least one first parameter to be used for determining at least one line parameter and selecting the at least one second parameter to be used for verifying the determined at least one line test parameter.

18. The device according to claim 12, wherein the device is configured to:
generate the test signal in a further time section with a same potential at the first and second test outputs; and
measure at least one parameter of the line signal resulting from the test signal in the further time section; and
determine at least one line test parameter based on the at least one first parameter and the at least one parameter resulting from the test signal in the further time section.

19. The device according to claim 18, wherein the at least one first parameter and the at least one parameter of the line signal resulting from the test signal in the further time section includes one or more of the parameters of the group of parameters comprising:
a DC voltage between the first wire and ground,
a DC voltage between the second wire and ground,
an AC voltage between the first wire and ground,
an AC voltage between the second wire and ground,
a DC current flowing in the first wire,
a DC current flowing in the second wire
an AC current flowing in the first wire, and
an AC current flowing in the second wire.

20. The device according to claim 12, wherein the constant value is in absolute value equal or smaller than 15% of the absolute value of the voltage between the first and second test outputs.

21. A DSL system comprising:
a line test circuit, the line test circuit comprising:
a first test signal output;
a second test signal output;
a signal generator to generate a test signal to be applied to a first and second wire of a subscriber line, wherein the signal generator is configured to generate the test signal at the first and second test signal outputs in a first time section such that a first potential at the first test signal output is changed from a first value to a second value and a second potential at the second test signal output is maintained constant during the change of the first potential, the signal generator further configured to generate the test signal during a second time section such that the first potential at the first output and the second potential at the second output are oscillating with a predetermined frequency.

* * * * *